(12) United States Patent
Fukatsu et al.

(10) Patent No.: US 6,219,323 B1
(45) Date of Patent: Apr. 17, 2001

(54) ON-VEHICLE ELECTRONIC DEVICE ASSEMBLY

(75) Inventors: Hironari Fukatsu; Tatsumi Muramatsu; Noboru Ishibashi, all of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 08/992,367

(22) Filed: Dec. 17, 1997

(30) Foreign Application Priority Data

Dec. 20, 1996 (JP) ................................................ H8-342246
Dec. 20, 1996 (JP) ................................................ H8-342247

(51) Int. Cl.[7] ............................ G11B 33/02; H05K 9/00; H05K 5/02
(52) U.S. Cl. ........................ 369/75.1; 361/799; 174/51
(58) Field of Search ........................... 369/2, 6, 12, 75.1, 369/77.1; 248/27.1; 296/37.8, 37.12; 70/58; 312/7.1, 12, 245, 319.7; 455/602, 346; 224/483; 340/649; 361/737, 799; 174/51; 24/563

(56) References Cited

U.S. PATENT DOCUMENTS

| 4,260,849 | * | 4/1981 | Kirby ......................................... 174/51 |
| 4,384,368 | | 5/1983 | Rosenfeldt et al. .................. 359/154 |
| 4,631,641 | * | 12/1986 | Brombal et al. ..................... 361/818 |
| 4,660,900 | | 4/1987 | Paterlini ................................ 312/7.1 |
| 4,811,314 | | 3/1989 | Alves ..................................... 369/10 |
| 4,823,235 | * | 4/1989 | Suzuki et al. ........................ 361/816 |
| 4,945,335 | | 7/1990 | Kimura et al. ....................... 340/426 |
| 5,171,075 | | 12/1992 | Nagano ............................... 312/9.48 |
| 5,216,904 | | 6/1993 | Isaki ......................................... 70/58 |
| 5,278,808 | | 1/1994 | Takano .................................. 369/11 |
| 5,311,408 | * | 5/1994 | Ferchau et al. ....................... 361/818 |
| 5,397,160 | | 3/1995 | Landry ................................. 296/37.8 |
| 5,524,859 | | 6/1996 | Squires et al. ...................... 248/551 |
| 5,668,696 | * | 9/1997 | Schmitt ................................ 361/685 |
| 5,692,400 | | 12/1997 | Bliven et al. ........................... 70/58 |
| 5,779,197 | | 7/1998 | Kim .................................... 248/27.1 |
| 5,793,728 | | 8/1998 | Selby et al ......................... 369/77.1 |
| 5,815,468 | | 9/1998 | Muramatsu et al. ..................... 369/2 |
| 5,917,435 | * | 6/1999 | Kamiya et al. ...................... 340/995 |

FOREIGN PATENT DOCUMENTS

| 42 08 990 A1 | 9/1993 | (DE) . |
| 06107082 | 4/1994 | (JP) . |
| 8-293690A | 11/1996 | (JP) . |
| 08318792 | 12/1996 | (JP) . |

* cited by examiner

Primary Examiner—David L. Ometz
Assistant Examiner—Angel Castro
(74) Attorney, Agent, or Firm—Oliff & Berridge, PLC

(57) ABSTRACT

An on-vehicle electronic device assembly includes a mount frame fixed on a metallic portion of a vehicle body, a carriable unit removably disposed in the mount frame, and a metallic urging member mounted on the mount frame for urging the carriable unit in a direction of moving the carriable unit away from the mount frame. The carriable unit includes a carrier case having a grounding metal piece insertion hole formed therein in a position corresponding to the urging member, a metallic chassis disposed in the carrier case so as to shield electronic components, and a grounding metal piece loosely fitted into the grounding metal piece insertion hole for electrically connecting the metallic chassis and the urging member.

5 Claims, 19 Drawing Sheets

ON-VEHICLE ELECTRONIC DEVICE ASSEMBLY

BACKGROUND OF THE INVENTION

1. Field of the Invention

The present invention relates to an on-vehicle electronic device assembly to be installed in a vehicle.

2. Description of the Related Art

Conventionally, an electronic device such as an audio device, a communication device, a navigation device, or a like device is installed into a mounting space such as a 1DIN space, a 2DIN space, or a like space formed in an instrument panel of a vehicle.

In this case, the housing of an electronic device is electrically connected to a vehicle body serving as ground so as to shield electronic components contained in the housing against noise, static electricity, and the like. To establish this grounding, when the electronic device is installed into the mounting space, a fixing portion of the housing is brought in contact with a metallic portion of a vehicle body and fixed onto the vehicle body with bolts.

Thus, the conventional electronic device cannot be removed from a vehicle for independent use.

SUMMARY OF THE INVENTION

An object of the present invention is to solve the above-mentioned problem in the conventional on-vehicle electronic device assembly and to provide an on-vehicle electronic device assembly allowing the housing of an electronic device to be electrically connected to a vehicle body serving as ground so as to shield electronic components contained in the housing as well as allowing the electronic device to be removed from the vehicle for independent use.

Another object of the present invention is to provide an on-vehicle electronic device assembly enabling a CD player to be used as an electronic device thereof and capable of preventing a disc slipping off a user's hand, when placing or removing the disc on or from the CD player, from entering far into the interior of the CD player.

According to the present invention, an on-vehicle electronic device assembly includes a mount frame fixed on a metallic portion of a vehicle body, a carriable unit disposed in the mount frame such that it can be removed from the mount frame, and urging means made of metal and mounted on the mount frame for urging the carriable unit in a direction of moving the carriable unit away from the mount frame.

The carriable unit includes a carrier case having a grounding metal piece insertion hole formed therein in a position corresponding to the urging means, a metallic chassis disposed in the carrier case so as to shield electronic components, and a grounding metal piece loosely fitted into the grounding metal piece insertion hole for electrically connecting the metallic chassis and the urging means.

In this case, when the carriable unit is pressed into the mount frame against an urging force exerted by the urging means, the grounding metal piece electrically connects the metallic chassis to the urging means. As a result, the metallic chassis is electrically connected to a vehicle body serving as ground to thereby shield the electronic components contained in the carriable unit against noise, static electricity, and the like.

Also, when the carriable unit is drawn out from the mount frame, the metallic chassis is electrically disconnected from a vehicle body serving as ground.

Thus, not only is the grounding effect improved, but also the carriable unit removed from the mount frame can be connected to a household power unit and used outside a vehicle. Also, a resin portion of the carrier case is not susceptible to formation of scratches, thereby maintaining design appearance thereof.

Since the grounding metal piece is loosely fitted into the grounding metal piece insertion hole, leaving a clearance therearound, any error of manufacture of the mount frame, carriable unit, or like component is absorbed by the clearance. Accordingly, the metallic chassis and a vehicle body serving as ground can be electrically connected together in a removable manner.

An on-vehicle electronic device assembly according to another aspect of the present invention includes an outer frame, a CD player disposed in the outer frame such that the CD player can be advanced and retracted, and disc entry prevention means for preventing a disc from entering far into the interior of the CD player through a clearance formed between the outer frame and the CD player when the CD player is situated at an advanced position.

When the CD player is drawn out to the advanced position thereof, a clearance is formed between the outer frame and the CD player; however, the disc entry prevention means prevents a disc from entering far into the interior of the CD player through the clearance.

Accordingly, even when a disc slips off a user's hand when the user attempts to place the disc on the CD player or to remove the disc from the CD player, the disc is prevented from entering far into the interior of the CD player through the above-mentioned clearance.

Also, when an on-vehicle electronic device cannot be disposed horizontally in a center console of a vehicle, the disc entry prevention means prevents a disc from entering far into the interior of the CD player through the clearance formed between the outer frame and the CD player and thus from being scratched.

BRIEF DESCRIPTION OF THE DRAWINGS

The structure and features of the on-vehicle electronic device assembly according to the present invention will be readily appreciated as the same becomes better understood by referring to the drawings, in which.

DESCRIPTION OF THE PREFERRED EMBODIMENTS

Embodiments of the present invention will next be described in detail with reference to the drawings.

Figure 1:
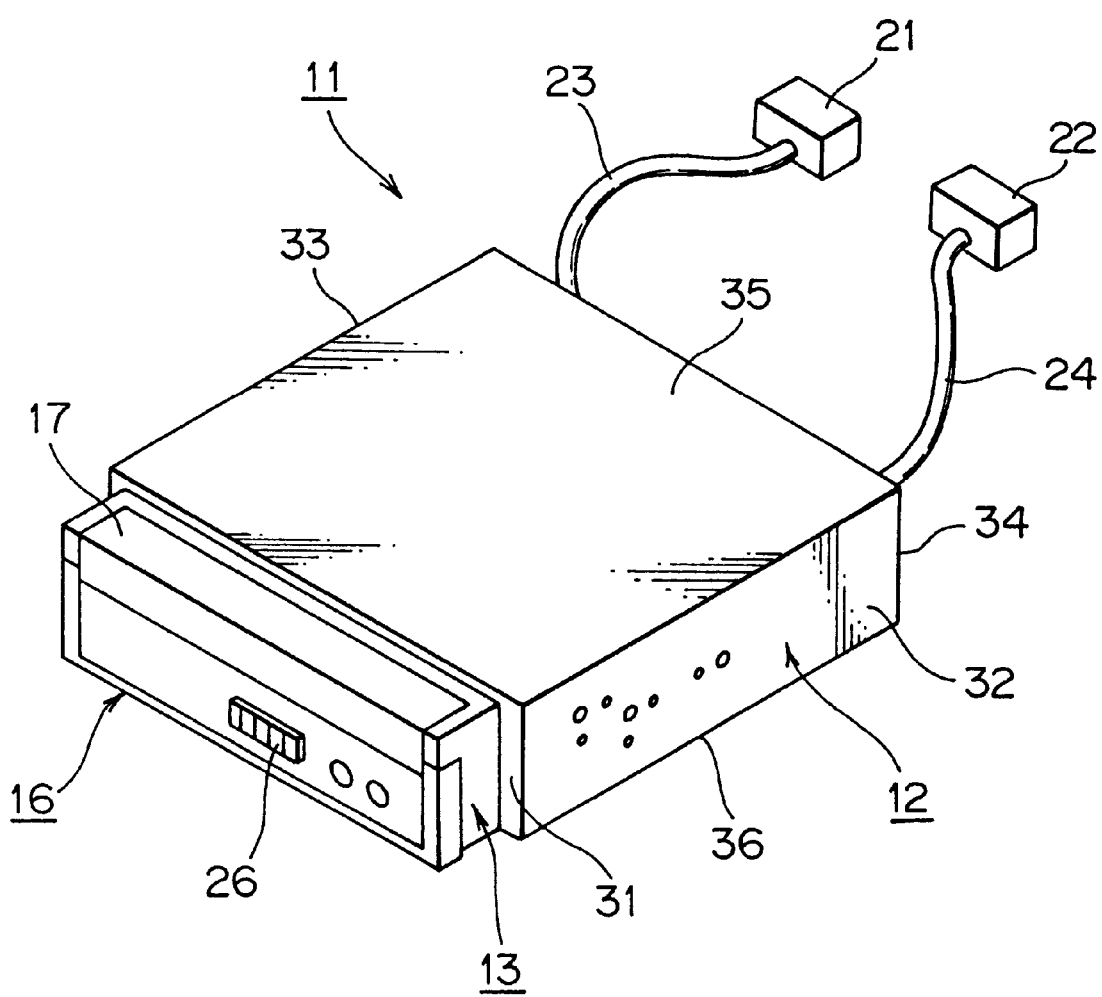
FIG. 1 is a perspective view of an on-vehicle electronic device assembly in an audio mode according to a first embodiment of the present invention.
Figure 2:
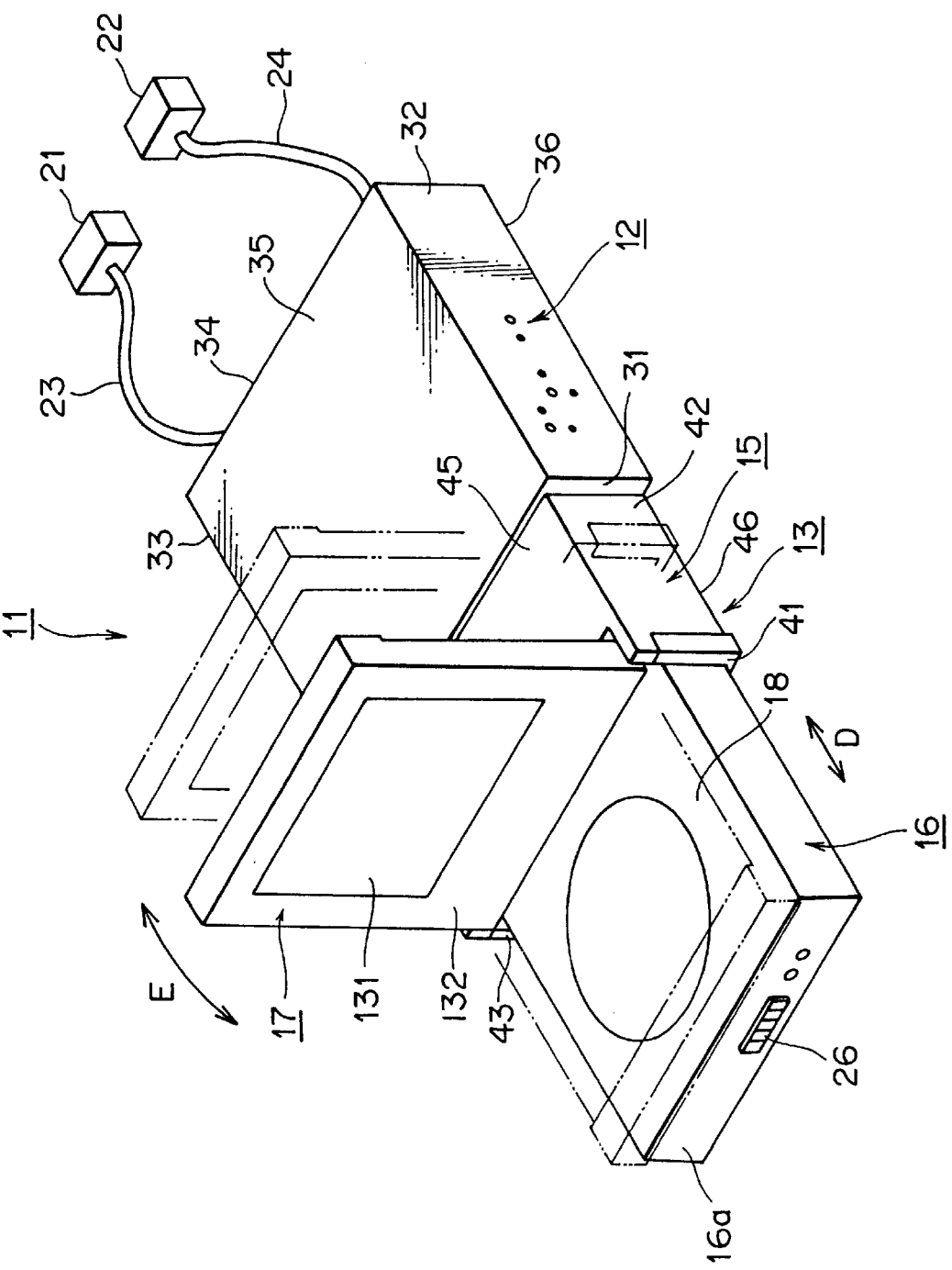
FIG. 2 is a perspective view of the on-vehicle electronic device assembly of FIG. 1 in a visual mode.
Figure 3:
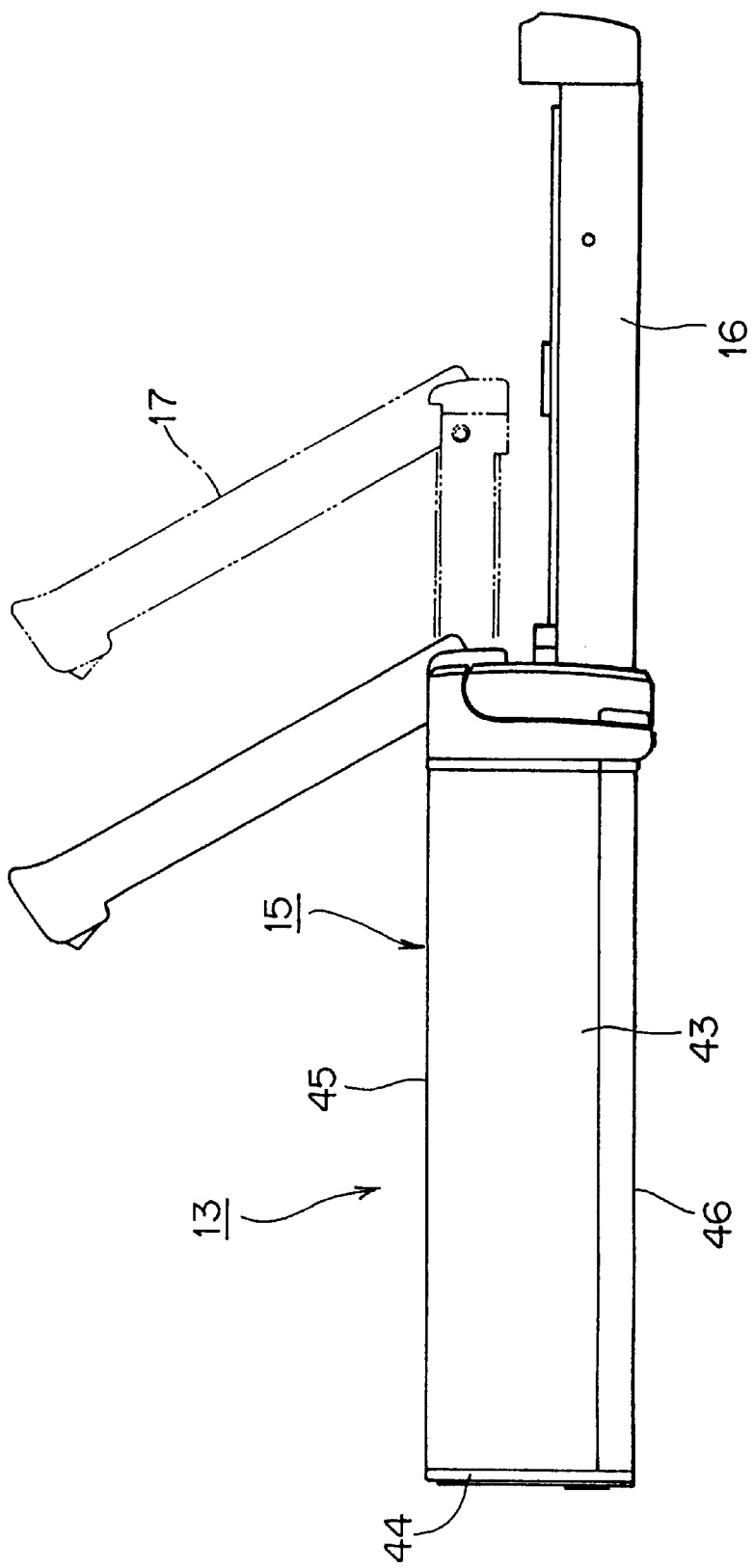
FIG. 3 is a side view of a carriable unit in the first embodiment.

FIG. 1 is a perspective view of an on-vehicle electronic device assembly in an audio mode according to a first embodiment of the present invention; FIG. 2 is a perspective view of the on-vehicle electronic device assembly of FIG. 1 in a visual mode; and FIG. 3 is a side view of a carriable unit in the first embodiment.

In these drawings, reference numeral 11 denotes an on-vehicle electronic device assembly according to a first embodiment of the present invention. Numeral 12 denotes a metallic mount frame to be mounted to an unillustrated metallic portion of a vehicle body, i.e. disposed in a 1DIN space of an instrument panel, to thereby be electrically connected to the vehicle body serving as ground. Numeral 13 denotes a carriable unit including an electronic device, such as an audio device, a communication device, a navigation device, or a like device. The carriable unit 13 is removably disposed in the mount frame 12. The carriable unit 13 includes a carrier case 15 formed from a resin, metal, or like material and coated with paint, a slide table 16 disposed in the carrier case 15 slidably in directions of arrow D, and a display unit 17 disposed in the carrier case 15 slidably in directions of arrow D and swingably about an unillustrated hinge in directions of arrow E.

The mount frame 12 includes a front wall 31 having an opening formed therein for allowing a user to mount the carriable unit 13 into the mount frame 12 or remove the carriable unit 13 from the mount frame 12 through the opening, side walls 32 and 33, a rear wall 34 to which composite cables 23 and 24 are connected, a top wall 35, and a bottom wall 36. The mount frame 12 is fixed on a metallic portion of a vehicle with unillustrated bolts.

Reference numerals 21 and 22 denote connectors connected to the tips of the cables 23 and 24, respectively. The connectors 21 and 22 are connected to a sensor unit or a like unit in the instrument panel of the vehicle.

The carrier case 15 includes a front wall 41 having an opening formed therein for allowing a user to insert the slide table 16 and the display unit 17 into the carrier case 15 through the opening, side walls 42 and 43, a rear wall 44, a top wall 45, and a bottom wall 46. The front wall 41 and the rear wall 44 are formed from a resin, whereas the side walls 42 and 43, the top wall 45, and the bottom wall 46 are formed from metal.

A CD tray 18 is disposed on the slide table 16 for receiving an unillustrated disc used as a data source. A display 131 is disposed on the display unit 17 so that a user can visually recognize an image displayed thereon.

In order to operate the carriable unit 13, an operation unit 26, including a switch, keys, a speaker, a remote-control light receiver, and like controls, is formed on a front panel 16a of the slide table 16.

In a visual mode, a user draws out the display unit 17 from the carriable unit 13 and raises the display unit 17 and then performs a relevant operation from the operation unit 26 or an unillustrated remote controller to display an image on the display 131. In an audio mode, a user draws out the slide table 16 from the carriable unit 13 and loads a disc onto the CD tray 18 and then performs a relevant operation from the operation unit 26 to operate an unillustrated CD player. When the carriable unit 13 is not to be used, the display unit 17 is brought down and the slide table 16 is retracted into the carriable unit 13. Reference numeral 132 denotes a front panel of the display unit 17.

Next will be described an engagement mechanism for removably engaging the carriable unit 13 with the mount frame 12.

Figure 4:
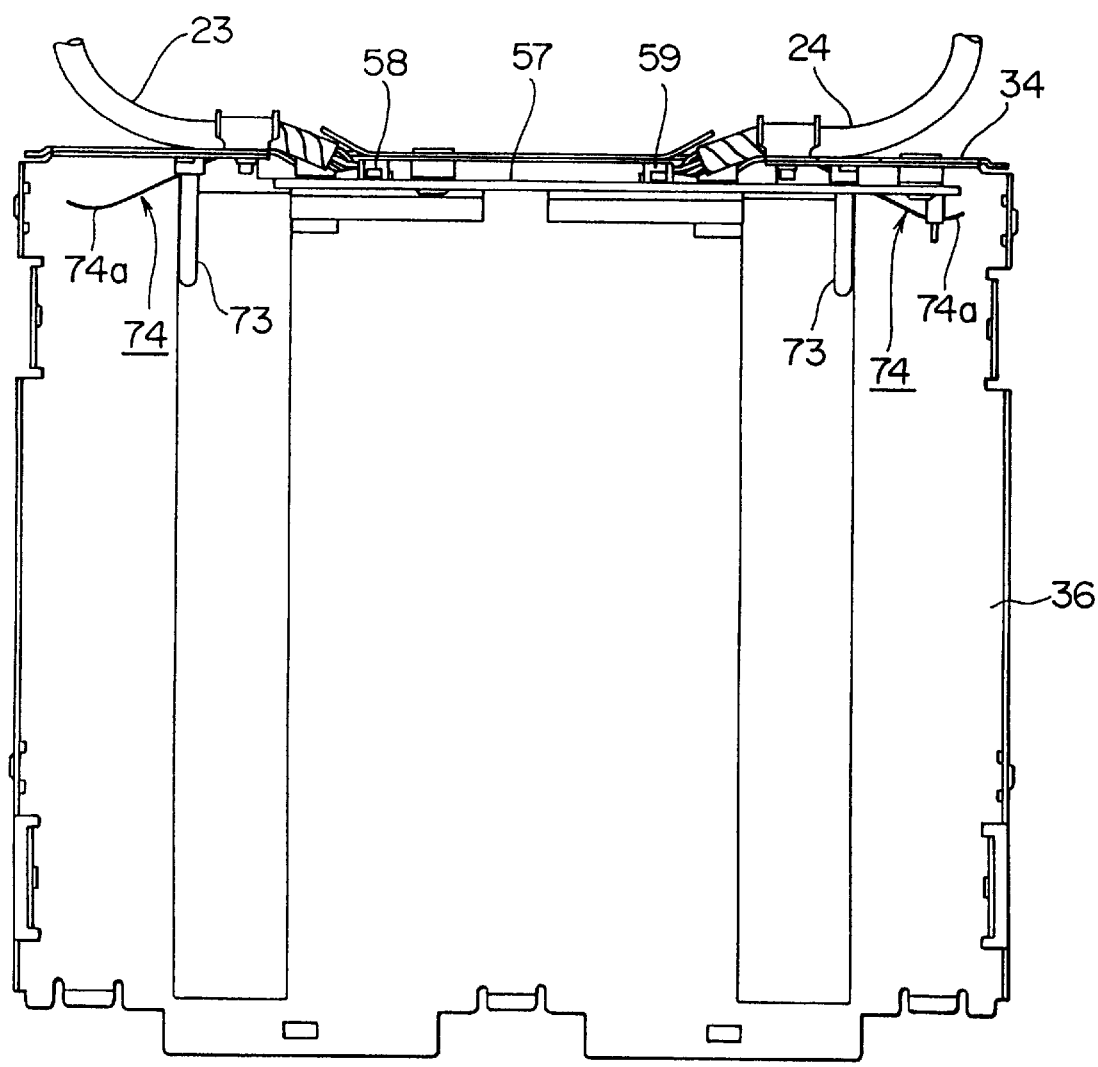
FIG. 4 is a sectional plan view of a mount frame in the first embodiment.
Figure 5:
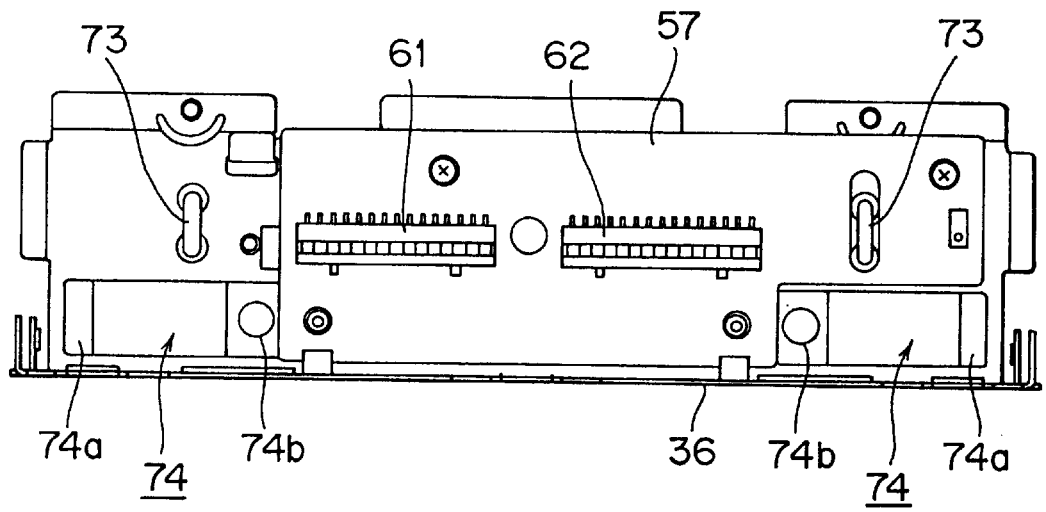
FIG. 5 is a sectional front view of the mount frame of FIG. 4.
Figure 6:
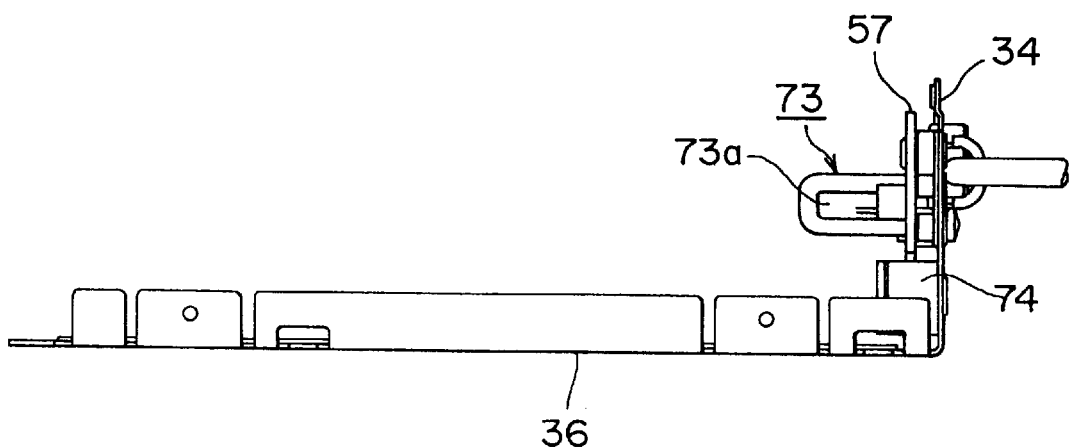
FIG. 6 is a sectional side view of the mount frame of FIG. 4.
Figure 7:
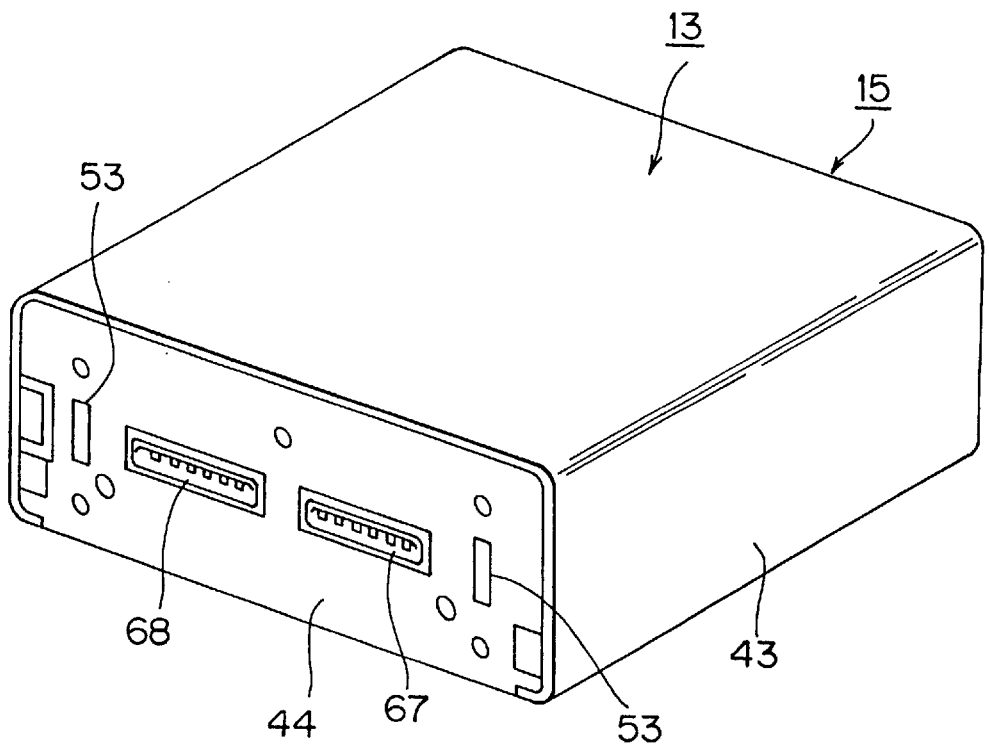
FIG. 7 is a perspective rear view of a carriable unit in the first embodiment.
Figure 8:
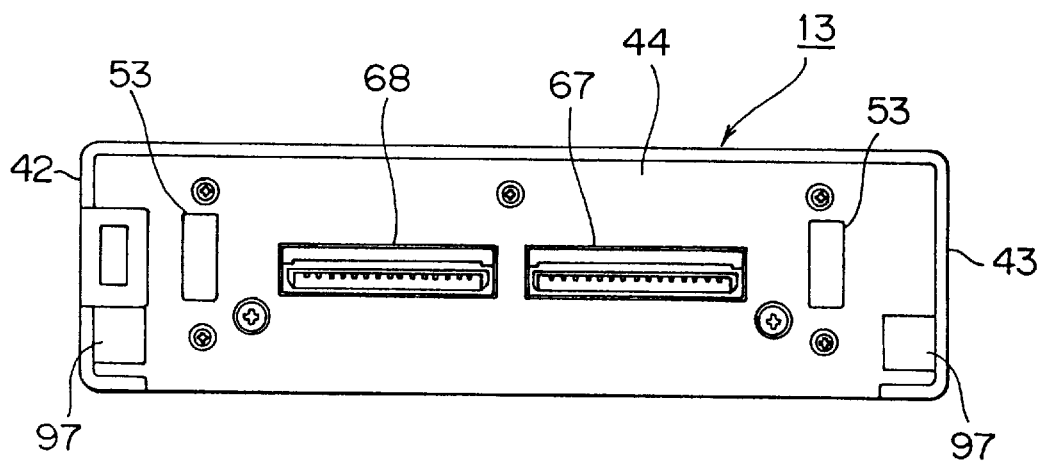
FIG. 8 is a rear view of the carriable unit of FIG. 7.
Figure 9:
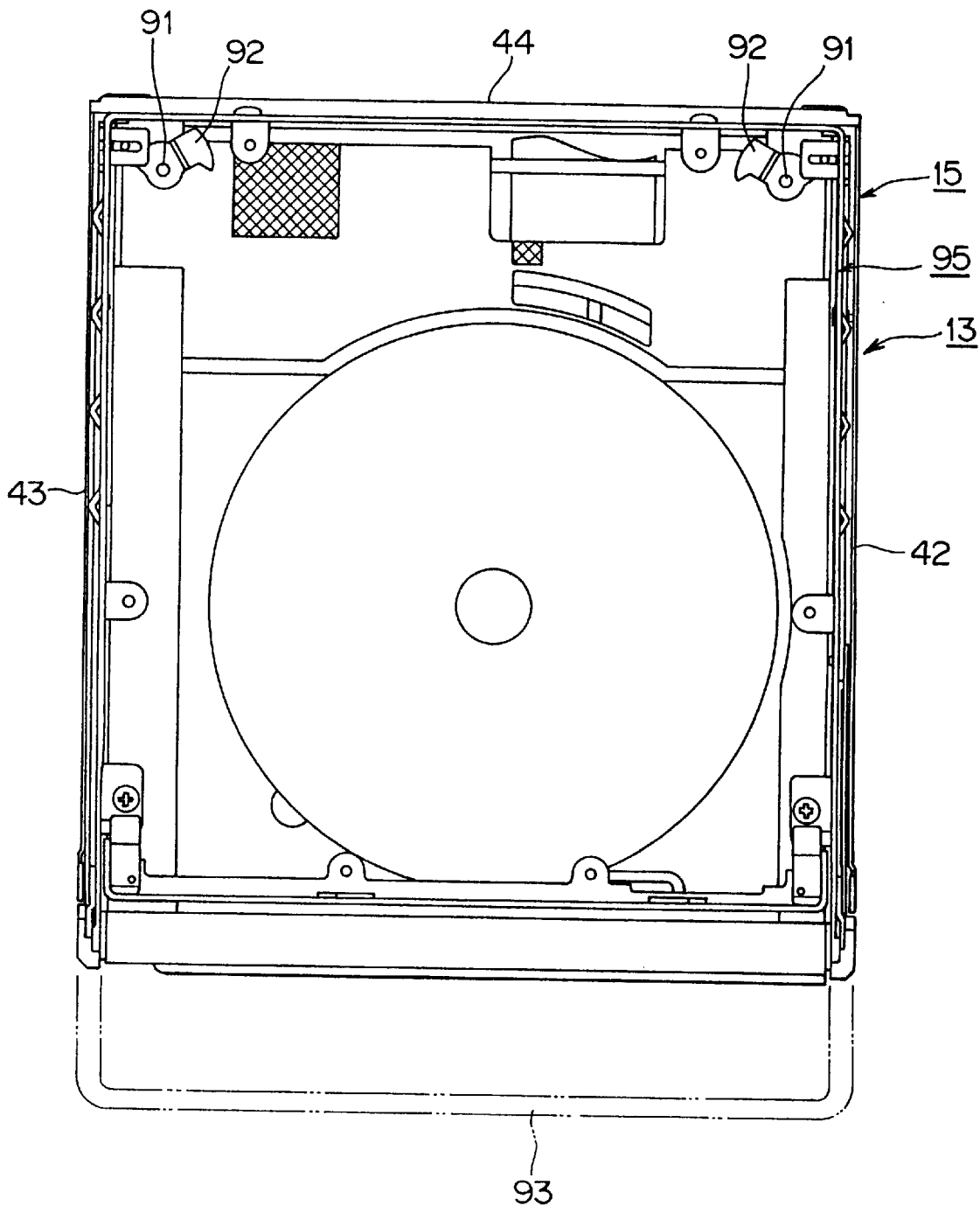
FIG. 9 is a sectional view of the carriable unit of FIG. 7.

FIG. 4 is a sectional plan view of a mount frame in the first embodiment; FIG. 5 is a sectional front view of the mount frame of FIG. 4; FIG. 6 is a sectional side view of the mount frame of FIG. 4; FIG. 7 is a perspective rear view of a carriable unit in the first embodiment; FIG. 8 is a rear view of the carriable unit of FIG. 7; and FIG. 9 is a sectional view of the carriable unit of FIG. 7.

In these drawings, reference numeral 34 denotes a rear wall of the mount frame 12 (FIG. 1), and numeral 36 denotes a bottom wall of the mount frame 12. A mount-frame-side printed circuit board 57 is mounted on the inner surface of the rear wall 34. The cables 23 and 24 are connected to the rear surface of the printed circuit board 57 via connectors 58 and 59. Connectors 61 and 62 are provided on the front surface of the printed circuit board 57.

Connectors 67 and 68 are provided on the outer surface of the rear wall 44 of the carrier case 15 and are removably connected to the connectors 61 and 62, respectively. Accordingly, when the carriable unit 13 is pressed into the mount frame 12, the connectors 67 and 68 are connected to the connectors 61 and 62, respectively, thereby establishing an electrical connection between the carriable unit 13 and the mount frame 12. Reference numerals 42 and 43 denote side walls of the carrier case 15.

Substantially U-shaped engagement pieces 73 are formed on the rear wall 34 such that the engagement pieces 73 project inwardly at both side positions. The engagement pieces 73 each have an engagement hole 73a formed therein. When the carriable unit 13 is pressed into the mount frame 12, substantially S-shaped engagement members 92 provided or the carriable unit 13 are engaged with the corresponding engagement pieces 73, whereby the carriable unit 13 is held by the mount frame 12.

In this connection, openings 53 are formed in the rear wall 44 so as to receive the engagement pieces 73 into the carriable unit 13 when the carriable unit 13 is pressed into the mount frame 12. The engagement members 92 are pivotably supported by respective pins 91 in the carriable unit 13 and urged forwardly (downwardly in FIG. 9) by unillustrated springs.

When an L-shaped lever 93 is turned from a vertical position to a horizontal position, a bent portion formed at one end of the engagement member 92 is disengaged from the engagement hole 73a formed in the engagement piece 73. After the carriable unit 13 is inserted into the mount frame 12 with the lever 93 being held in the horizontal position, when the lever 93 is turned from the horizontal position to the vertical position, the engagement members 92 are engaged with the corresponding engagement holes 73a, thereby locking the carriable unit 13 in the mount frame 12.

When the lever 93 is turned from the vertical position to the horizontal position, unillustrated links rotate, causing the engagement members 92 to rotate to thereby disengage the engagement members 92 from the engagement holes 73a. As a result, the carriable unit 13 is unlocked from the mount frame 12 and thus can be drawn out from the mount frame 12.

Metallic plate springs 74 serving as urging means are fixed on the rear wall 34 in a cantilever manner by caulked pins 74b, thereby establishing an electric connection between the plate springs 74 and the mount frame 12. Pressing portions 74a formed on the free ends of the plate springs 74 are opposed to the rear wall 44 of the carrier case 15. Accordingly, when the carriable unit 13 is pressed into the mount frame 12, the rear wall 44 abuts the pressing portions 74a, causing the plate springs 74 to bend. As a result, the carriable unit 13 is urged forwardly (downwardly in FIG. 4) by the plate springs 74. When the lever 93 is turned from the vertical position to the horizontal position, the engagement pieces 73 and the engagement members 92 are disengaged from each other. Thus, the pressing portions 74a push the rear wall 44, so that the carriable unit 13 is pushed by means of the urging force of the plate springs 74.

In the on-vehicle electronic device assembly 11, a metallic chassis 95 is disposed inside the carrier case 15 in order to shield unillustrated electronic components contained in the carriable unit 13 against noise, static electricity, and the like. The metallic chassis 95 surrounds the slide table 16, the display unit 17, and the like and is electrically connected to the plate springs 74 via grounding metal pieces 97 disposed on the rear wall 44.

Figure 10:
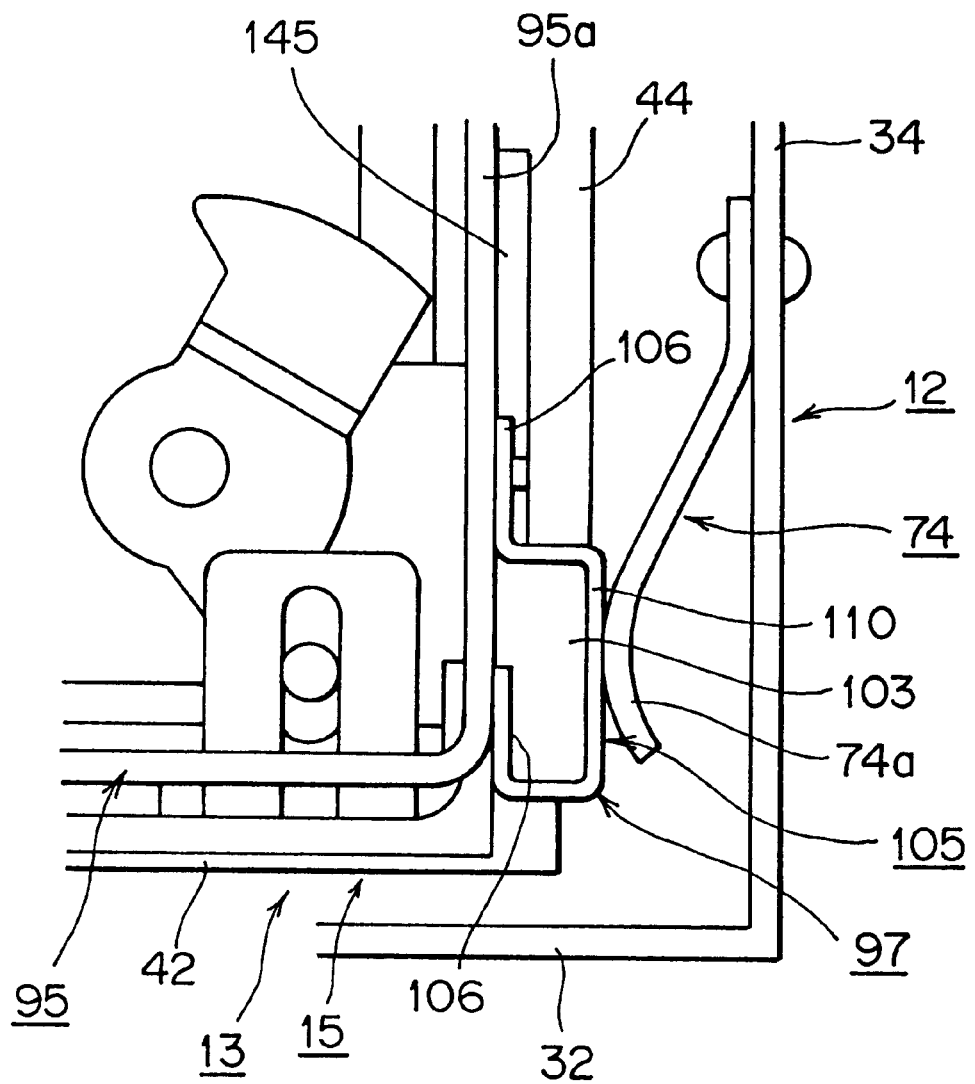
FIG. 10 is an enlarged view of a grounding portion of the on-vehicle electronic device assembly of FIG. 1.
Figure 11:
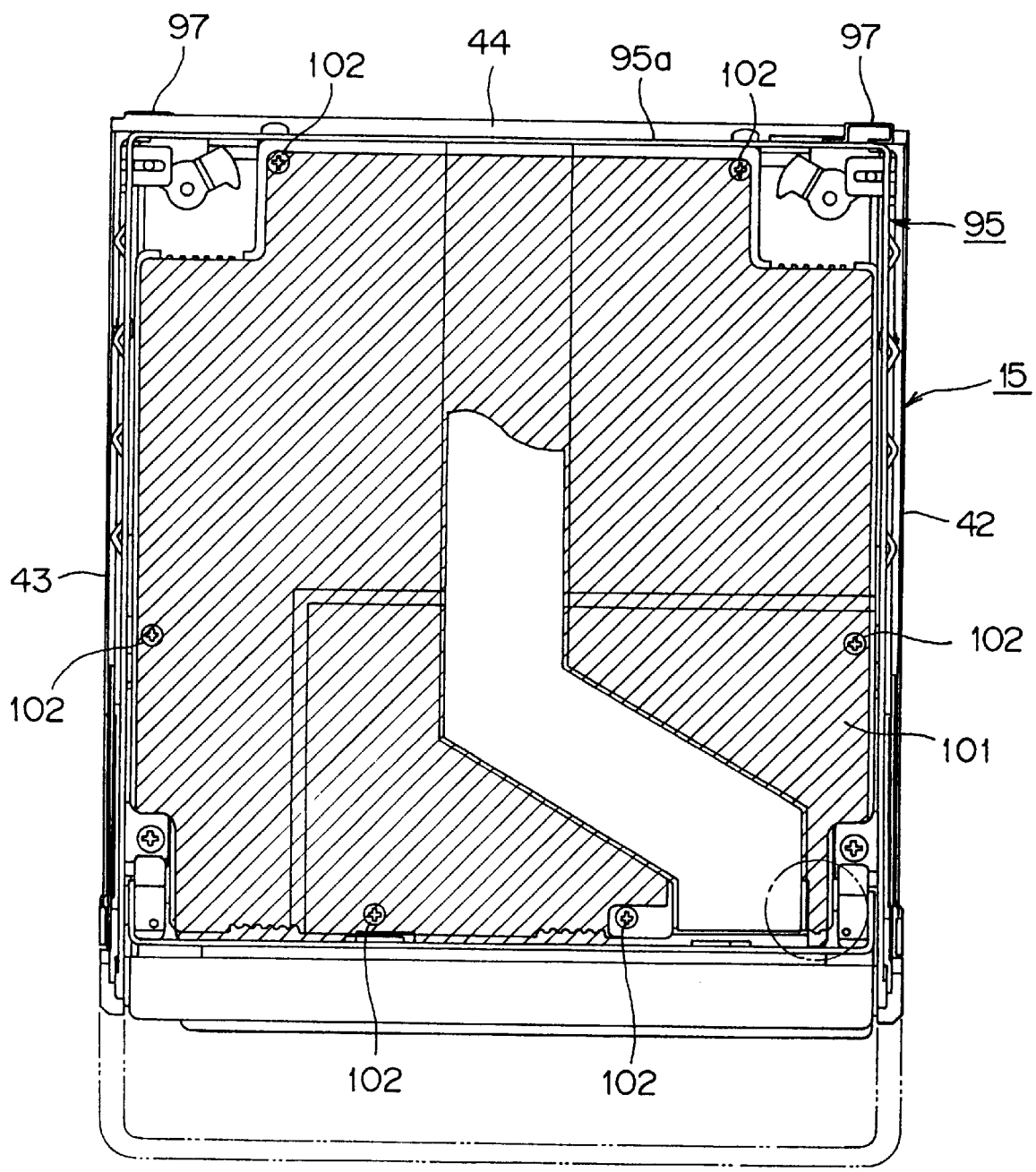
FIG. 11 is a view showing the disposition of a control board of the on-vehicle electronic device assembly of FIG. 1.
Figure 12:
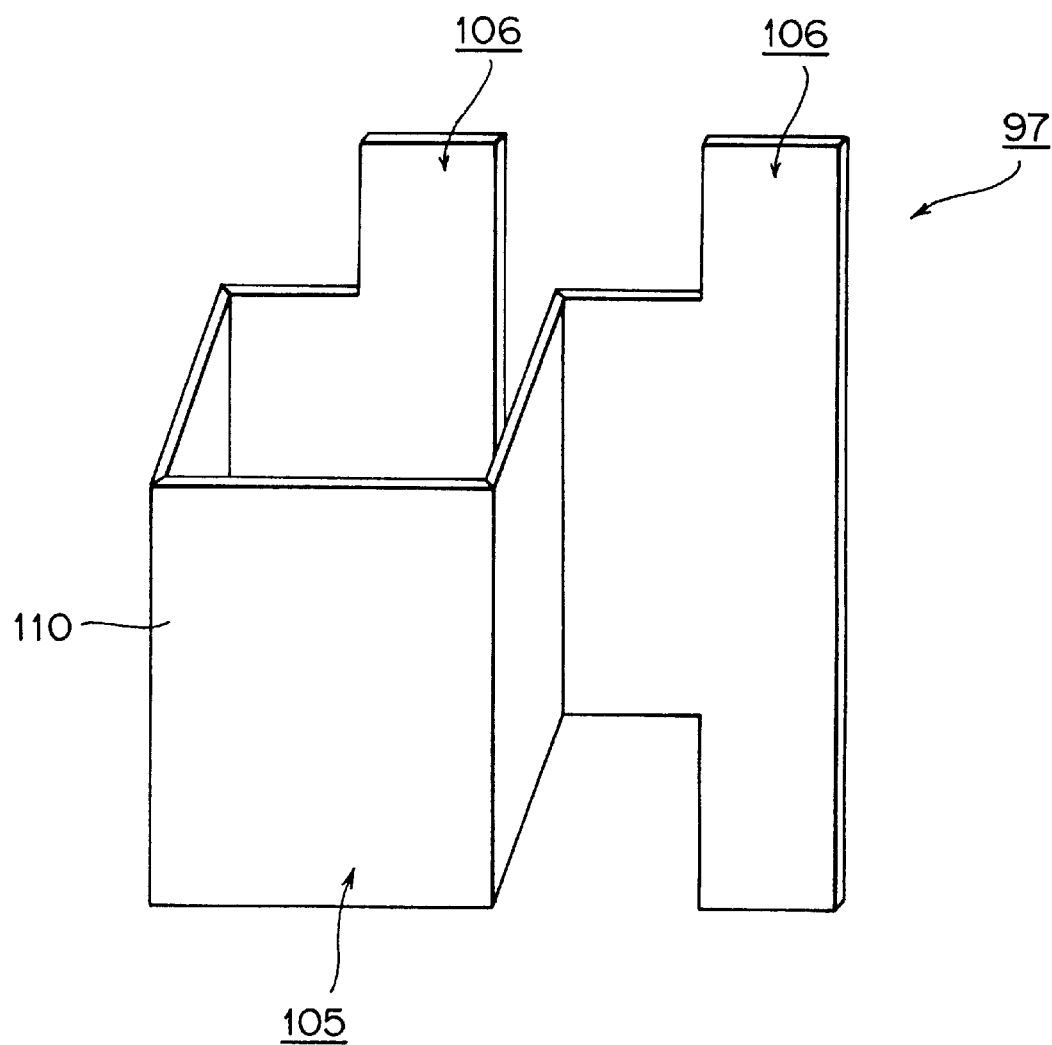
FIG. 12 is a perspective view of a grounding metal piece in the first embodiment.

FIG. 10 is an enlarged view of a grounding portion of the on-vehicle electronic device assembly of FIG. 1; FIG. 11 is a view showing the disposition of a control board of the on-vehicle electronic device assembly of FIG. 1; and FIG. 12 is a perspective view of a grounding metal piece in the first embodiment.

In these drawings, reference numeral 32 denotes a side wall of the mount frame 12, numeral 34 denotes a rear wall of the mount frame 12, numerals 42 and 43 denote side walls of the carrier case 15, numeral 44 denotes a rear wall of the carrier case 15, numeral 95 denotes a metallic chassis, numeral 95a denotes a rear wall of the metallic chassis 95, and numeral 101 denotes a control board fixed on the metallic chassis 95 with screws 102. Unillustrated electronic components are mounted on both sides of the control board 101.

Grounding metal piece insertion holes 103 are formed in the rear wall 44 at both sides so as to loosely receive the grounding metal pieces 97. The grounding metal piece 97 includes a trunk portion 105 and two leg portions 106 projecting from the trunk portion 105. When the grounding metal piece 97 is set in the grounding metal piece insertion hole 103, a front surface 110 of the trunk portion 105 faces the rear wall 34, and the leg portions 106 are in contact with the rear wall 95a.

Since the grounding metal piece insertion hole 103 has a shape corresponding to that of the trunk portion 105, when the carrier case 15 is assembled, the both leg portions 106 are positioned in a gap 145 defined by the rear wall 44 and the rear wall 95a, thereby being held between the rear wall 44 and the rear wall 95a. Thus, the grounding metal piece 97 does not come off the grounding metal piece insertion hole 103.

When the carriable unit 13 is pressed into the mount frame 12, the pressing portions 74a of the plate springs 74 abut the front surfaces 110 of the grounding metal pieces 97, thereby pressing the grounding metal pieces 97 against the rear wall 95a. Accordingly, an electrical connection is established between the plate springs 74 and the grounding metal pieces 97 and between the grounding metal pieces 97 and the metallic chassis 95, thereby establishing an electrical connection between the metallic chassis 95 and a vehicle body serving as ground.

Since the grounding metal piece 97 is loosely fitted into the grounding metal piece insertion hole 103, a clearance is formed between the trunk portion 105 and the grounding metal piece insertion hole 103 and around the leg portions 106 resting in the gap 145. Accordingly, any error of manufacture of the mount frame 12, the carriable unit 13, or a like component is absorbed by the clearances. Thus, the metallic chassis 95 and the vehicle body serving as ground can be electrically connected to each other in a detachable manner.

When the carriable unit 13 is drawn out from the mount frame 12, the pressing portions 74a are separated from the front surfaces 110; consequently, the metallic chassis 95 and the vehicle body serving as ground are electrically disconnected from each other.

Since the carriable unit 13 is removably disposed in the mount frame 12, the carriable unit 13 can be removed from the mount frame 12 for independent use.

Figure 13:
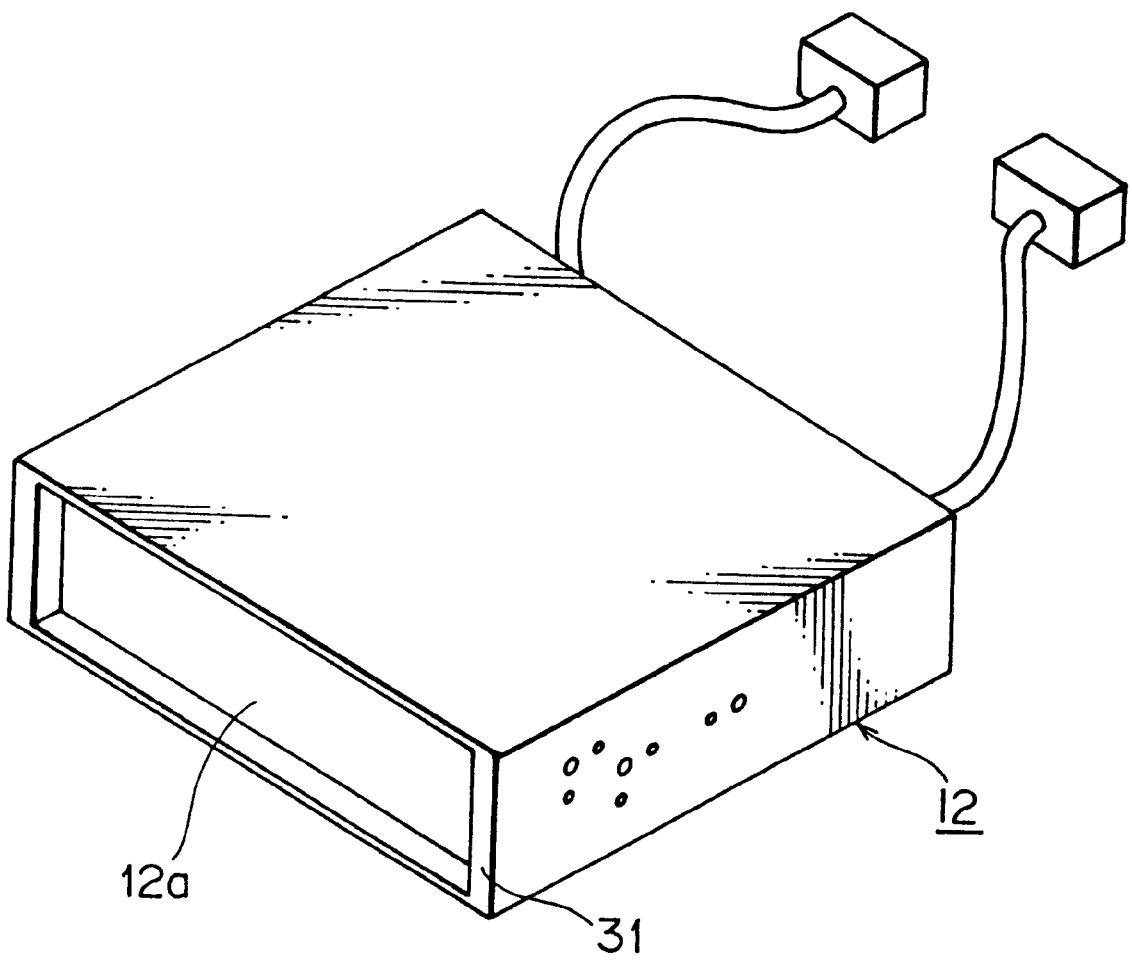
FIG. 13 is a perspective view of a mount frame in the first embodiment.
Figure 14:
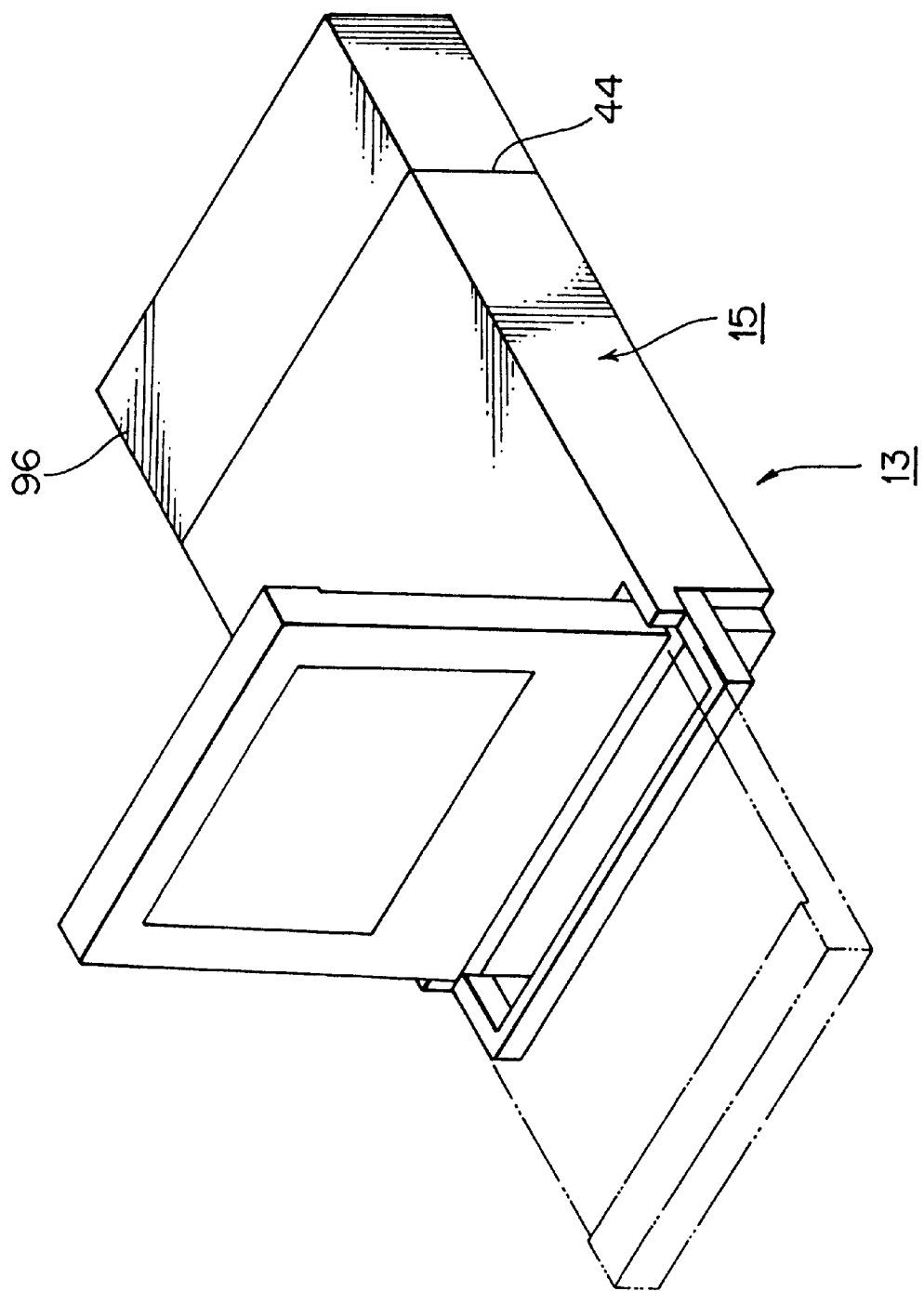
FIG. 14 is a view showing the use of the on-vehicle electronic device assembly of FIG. 1 outside a vehicle.
Figure 15:
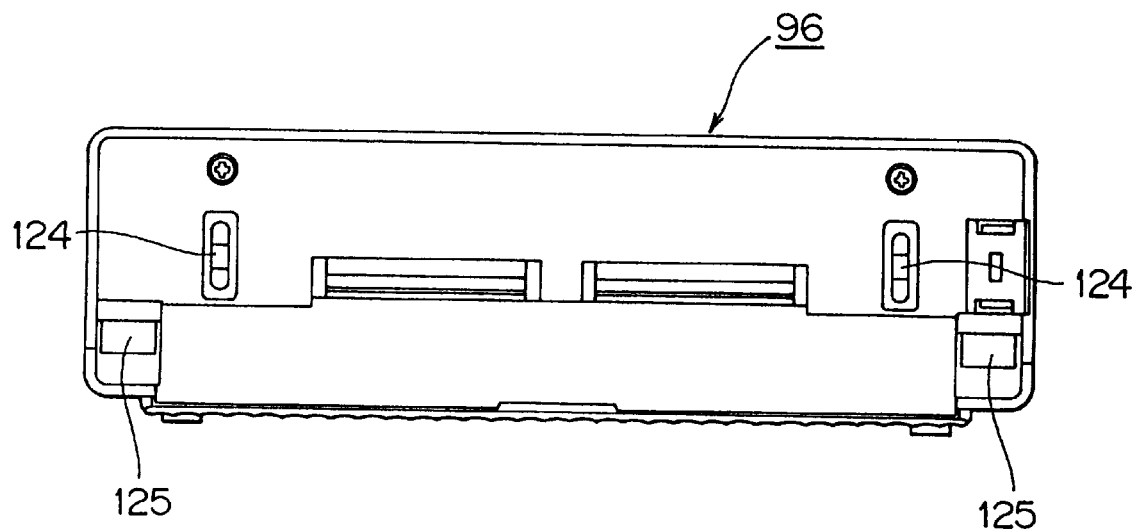
FIG. 15 is a front view of a household power unit in the first embodiment.
Figure 16:
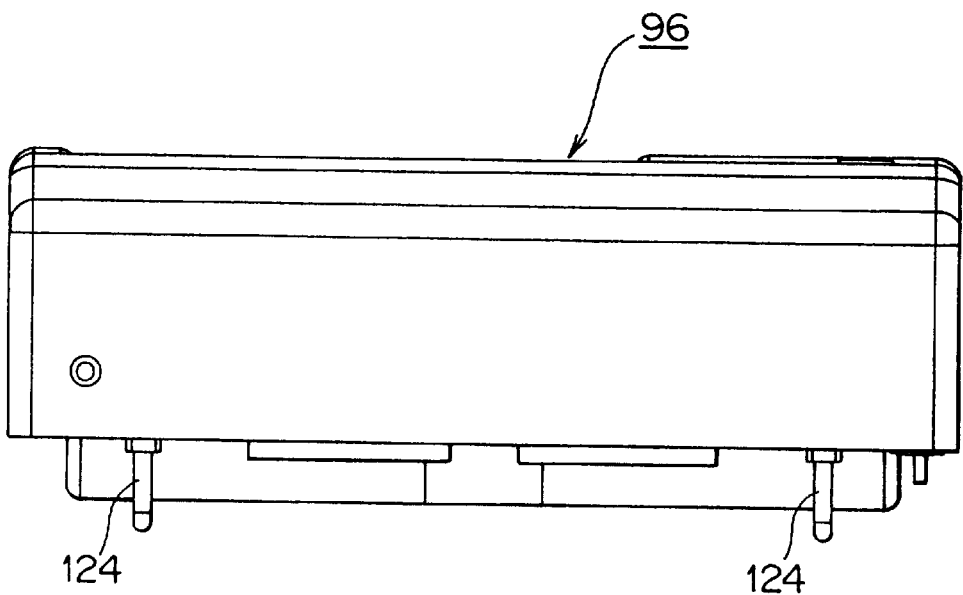
FIG. 16 is a plan view of the household power unit of FIG. 15.

FIG. 13 is a perspective view of a mount frame in the first embodiment; FIG. 14 is a view showing the use of the on-vehicle electronic device assembly of FIG. 1 outside a vehicle; FIG. 15 is a front view of a household power unit in the first embodiment; and FIG. 16 is a plan view of the household power unit of FIG. 15.

In these drawings, reference numeral 12 denotes a mount frame. When the carriable unit 13 is removed from the mount frame 12, a blind flap 12a covers an opening formed in the front wall 31 of the mount frame 12. Numeral 96 denotes a household power unit which is removably attachable to the rear wall 44 of the carrier case 15 of the carriable unit 13 removed from the mount frame 12. Therefore, when the carriable unit 13 is used outside the vehicle, the carriable unit 13 is removed from the mount frame 12, and the household power unit 96 is attached to the rear wall 44 of the carrier case 15 of the carriable unit 13.

The household power unit 96 has engagement pieces 124 which project forward from the household power unit 96 at both sides thereof. The engagement pieces 124 each have an unillustrated engagement hole formed therein. When the household power unit 96 is attached to the rear wall 44 of the carrier case 15, the engagement members 92 (FIG. 9) and the engagement pieces 124 are engaged with each other, so that the carriable unit 13 is coupled with the household power unit 96.

When the carriable unit 13 and the household power unit 96 are engaged with each other, plate springs 125 provided on the household power unit 96 and serving as urging means abut the front surfaces 110 of the trunk portions 105 of the grounding metal pieces 97 (FIG. 12), thereby pressing the grounding metal pieces 97 against the household power unit 96 via the plate springs 125. Accordingly, an electronic connection is established between the plate springs 125 and the grounding metal pieces 97 and between the grounding metal pieces 97 and the metallic chassis 95.

The above-mentioned on-vehicle electronic device assembly 11 (FIG. 2) is adapted such that a user can draw out the slide table 16 from the carriable unit 13 and load an unillustrated disc onto the CD tray 18. In the audio mode, a user can operate a CD player by operation from the operation unit 26.

In this tray loading type CD player, a disc can be clipped by a ball chucking device disposed on a turntable. This feature makes the use of a clamper unnecessary and thus enables the CD player to be thinner accordingly.

Figure 17:
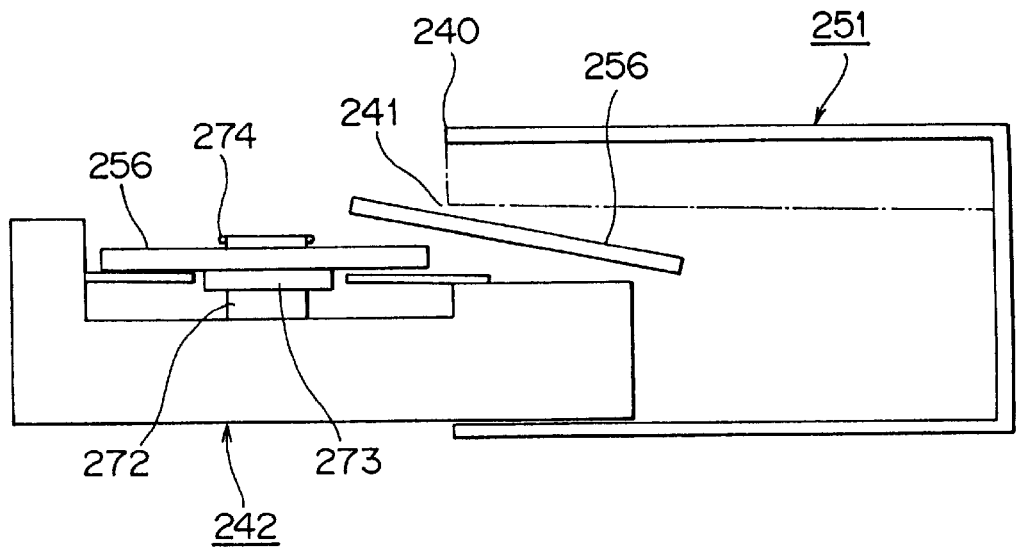
FIG. 17 is a sectional view of an on-vehicle electronic device assembly carrying a tray loading type CD player.

FIG. 17 is a sectional view of an on-vehicle electronic device assembly carrying a tray loading type CD player.

In FIG. 17, reference numeral 251 denotes a carrier case for an on-vehicle electronic device assembly, numeral 242 denotes a CD player which is disposed in the carrier case 251 to be advanced and retracted (leftward and rightward in FIG. 17), numeral 272 denotes a shaft, numeral 273 denotes a turntable of the CD player 242, numeral 256 denotes a disc such as a CD-ROM, a music CD, a video CD, a graphic CD, or a like CD, and numeral 274 denotes a ball chucking device for clipping the disc 256 placed on the CD player 242.

A user causes the CD player 242 to advance (move leftward in FIG. 17) by operating an unillustrated remote controller or an eject button or a like button on a front panel of the CD player 242, places the disc 256 on the CD player 242, and then causes the CD player 242 to retreat (move rightwardly in FIG. 17) into the on-vehicle electronic device assembly. Thereafter, the user can cause software contained in the disc 256 to be executed or data to be downloaded from the disc 256. In order to remove the disc 256 from the CD player 242, the user causes the CD player 242 to advance again by operating the remote controller or the eject button or a like button. An unillustrated control board carrying electronic components may be mounted on the lower surface of a top wall of the carrier case 251.

When the CD player 242 is situated in an advanced position, a relatively large gap 241 is formed between the CD player 242 and a front wall 240 of the carrier case 251. Accordingly, when a user places the disc 256 on the CD player 242 or removes the disc 256 from the CD player 242, the disc 256 slipping accidentally off the user's hand may enter far into the interior of the CD player 242 through the gap 241, resulting in a potential formation of scratches on the disc 256 or blocking the movement of the CD player 242.

An on-vehicle electronic device assembly can be not always disposed horizontally in a center console of a vehicle. For a certain vehicle, an on-vehicle electronic device assembly may be disposed inclined at an angle of 60 degrees with a horizontal direction. Also, in this case, when a user places the disc 256 on the CD player 242 or removes the disc 256 from the CD player 242, the disc 256 slipping accidentally off the user's hand may enter far into the interior of the CD player 242 through the gap 241, resulting in a potential formation of scratches on the disc 256.

Thus, an on-vehicle electronic device assembly according to a second embodiment of the present invention employs a feature to prevent the disc 256 from entering far into the interior of the CD player 242.

Figure 18:
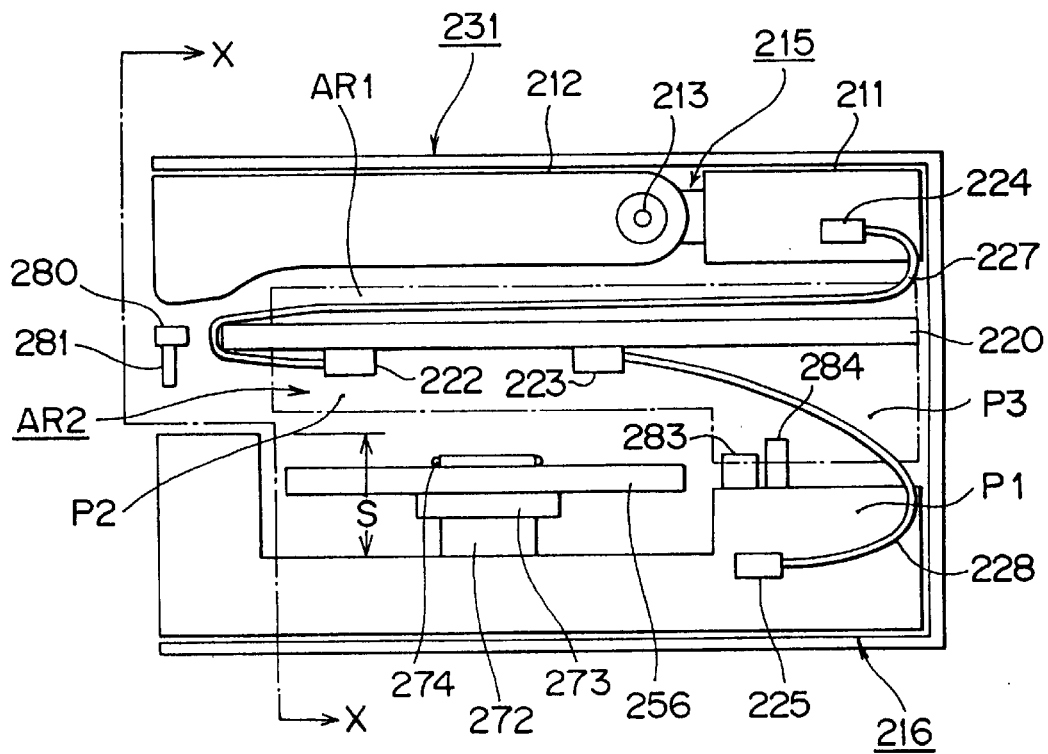
FIG. 18 is a schematic view showing how a display unit and a CD player are accommodated in a carriable unit of an on-vehicle electronic device assembly according to a second embodiment of the present invention.
Figure 19:
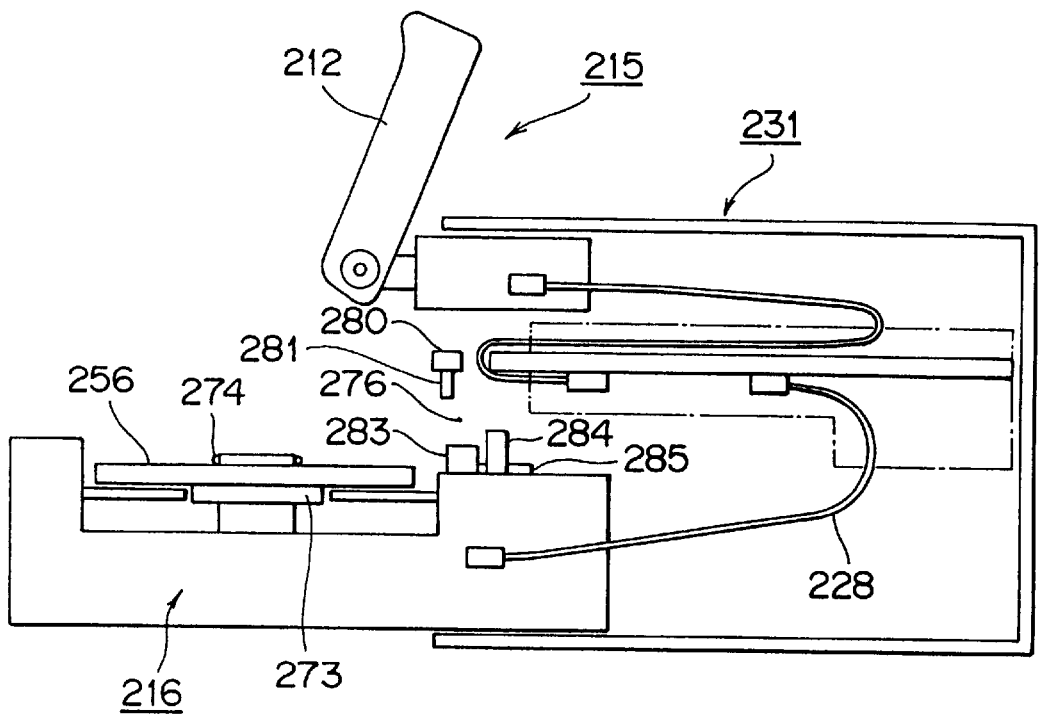
FIG. 19 is a schematic view showing a state of the second embodiment in which the display unit and the CD player are drawn out from the carriable unit.
Figure 20:
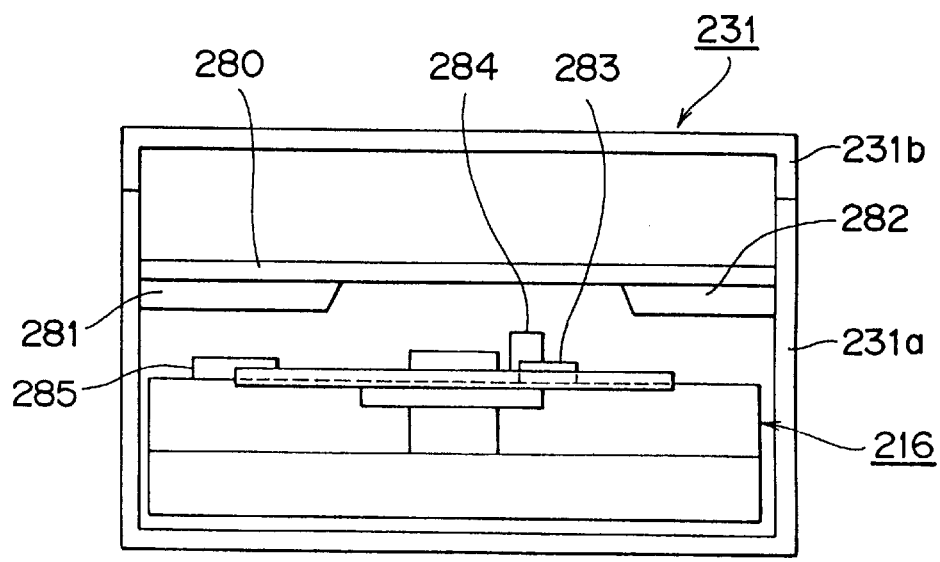
FIG. 20 is a sectional view taken along line X—X of FIG. 18.
Figure 21:
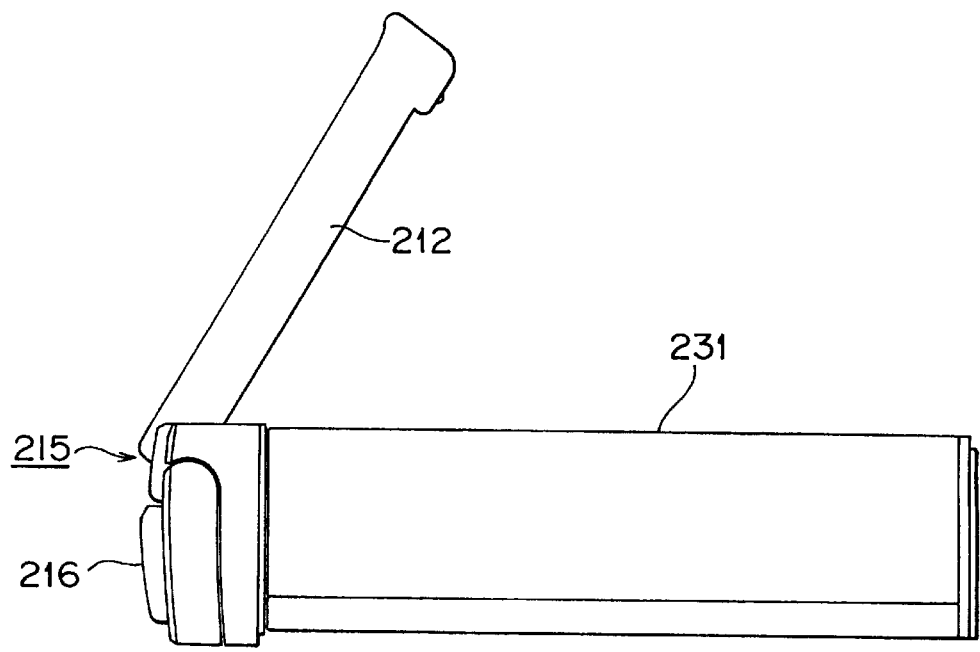
FIG. 21 is a side view of the carriable unit in the second embodiment.
Figure 22:
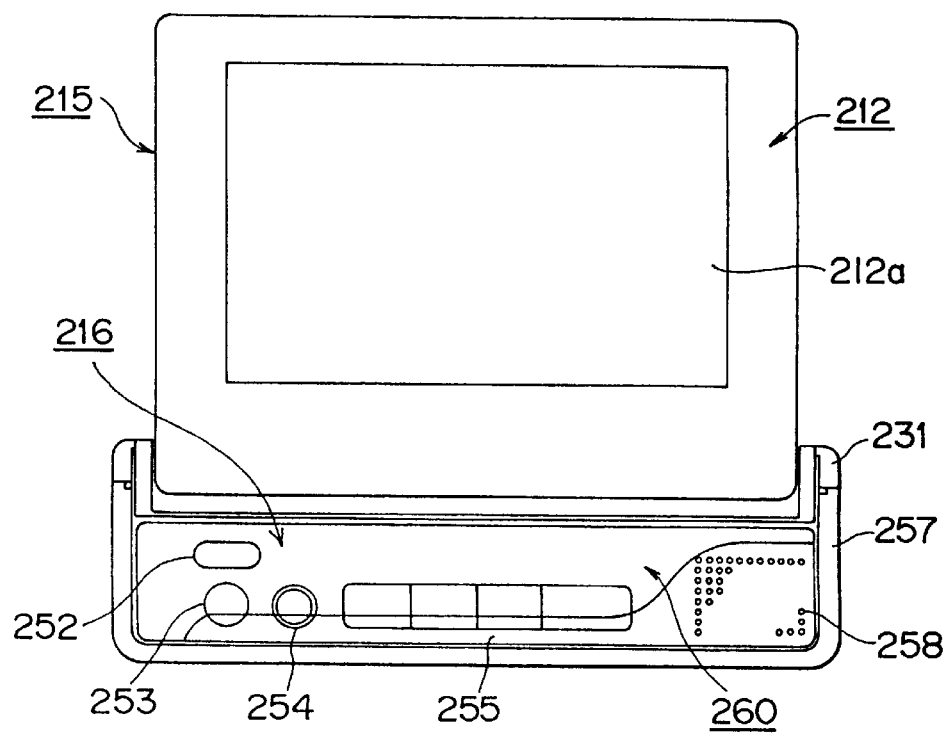
FIG. 22 is a front view of the carriable unit in the second embodiment.
Figure 23:
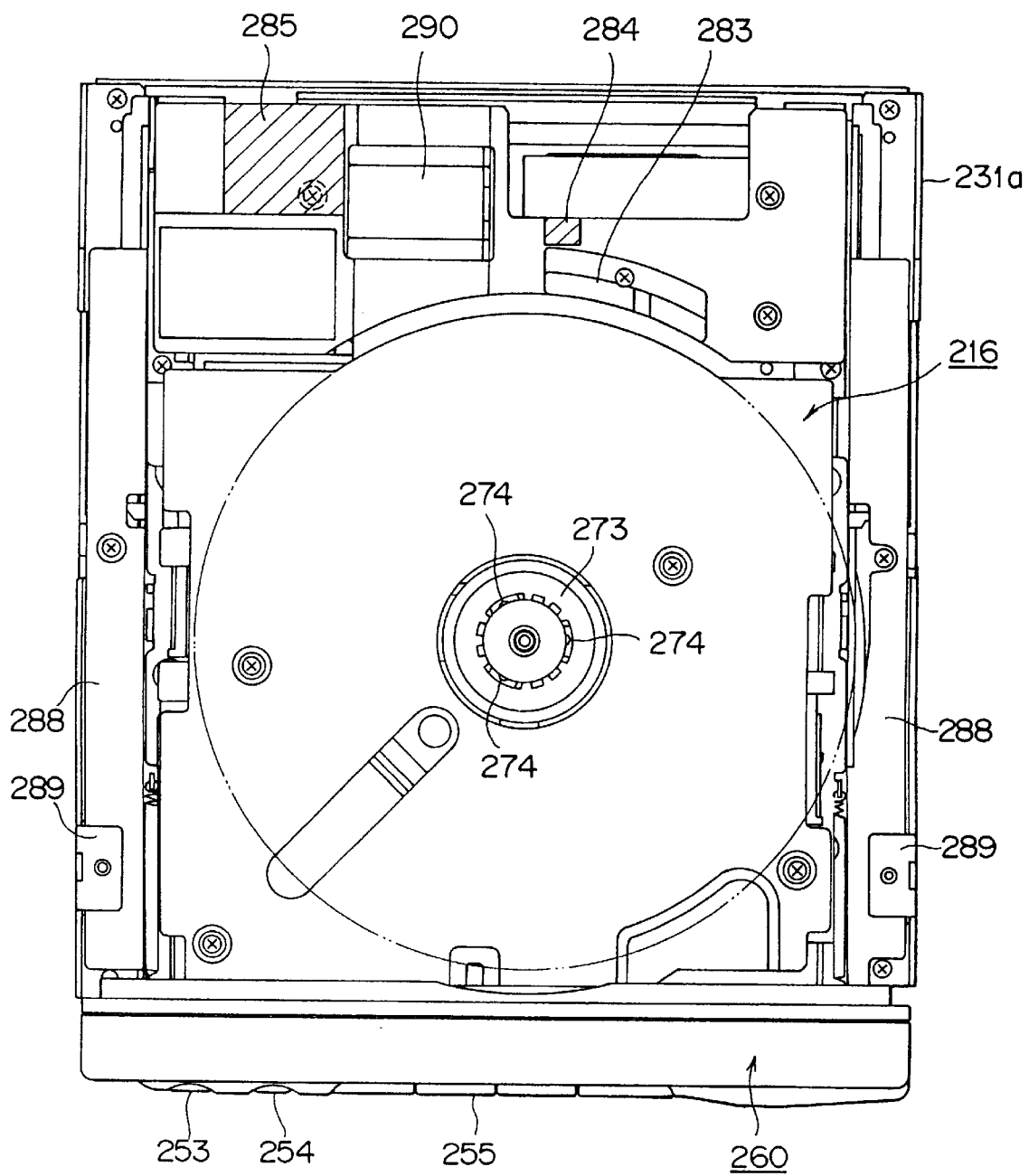
FIG. 23 is a plan view of the CD player in the second embodiment.
Figure 24:
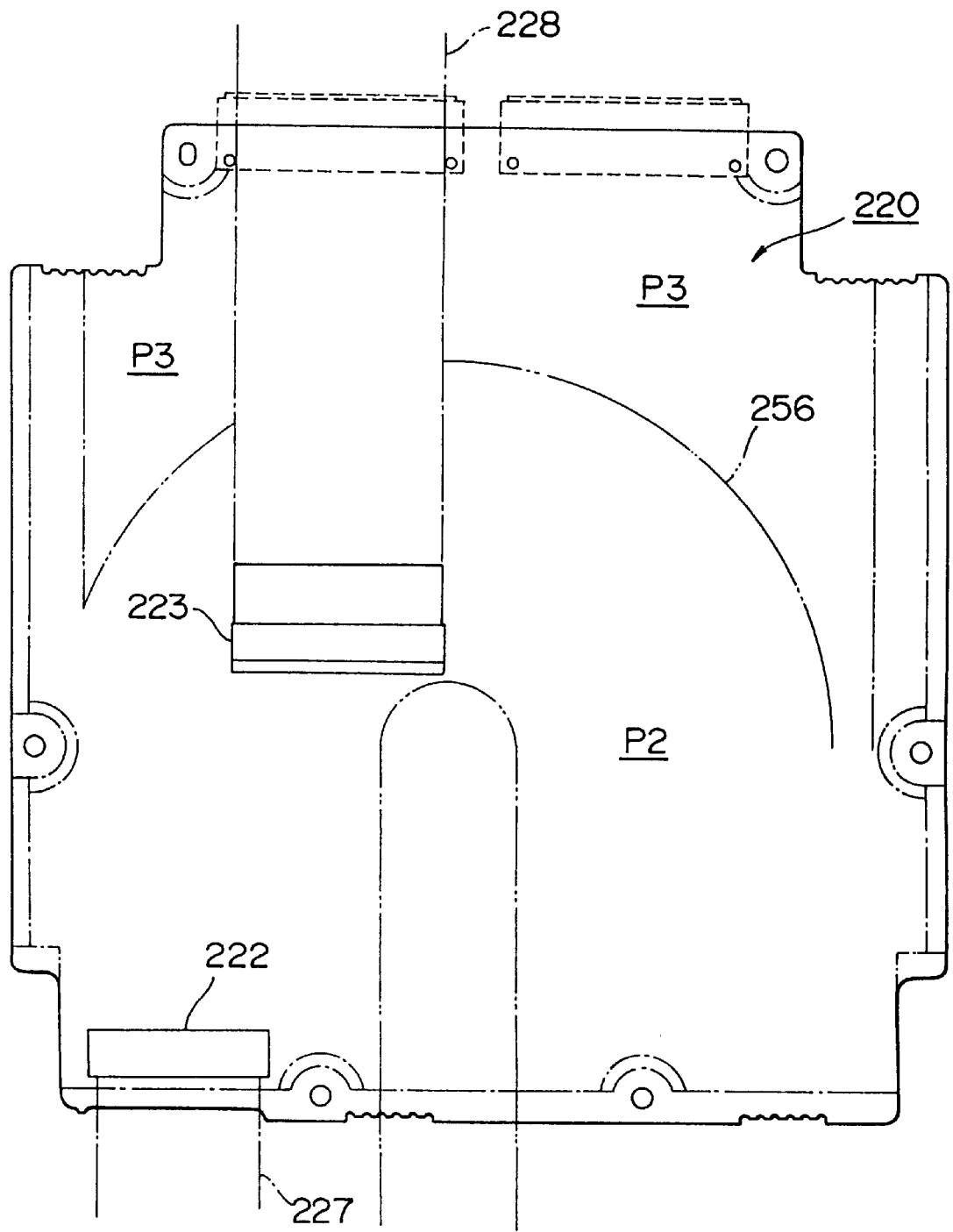
FIG. 24 is a bottom view of a control board in the second embodiment.
Figure 25:
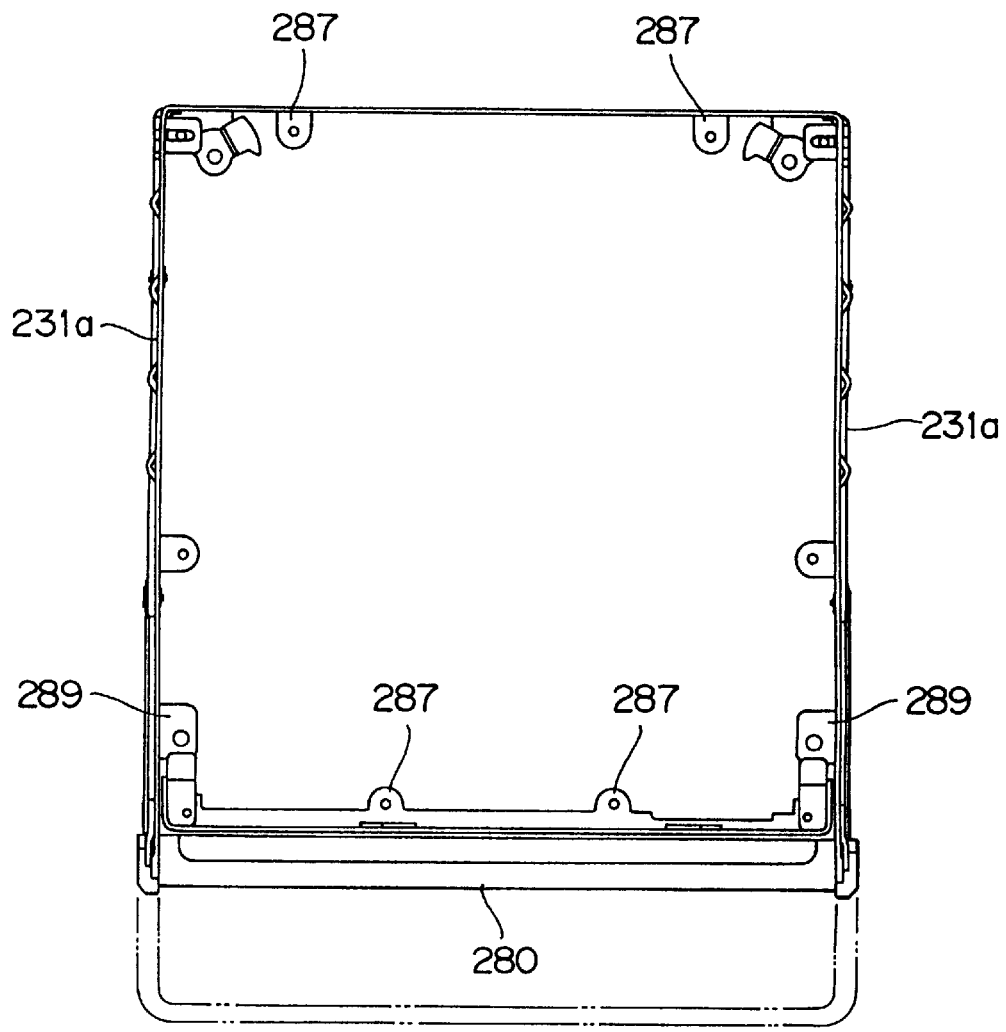
FIG. 25 is a sectional view of a lower frame in the second embodiment.
Figure 26:
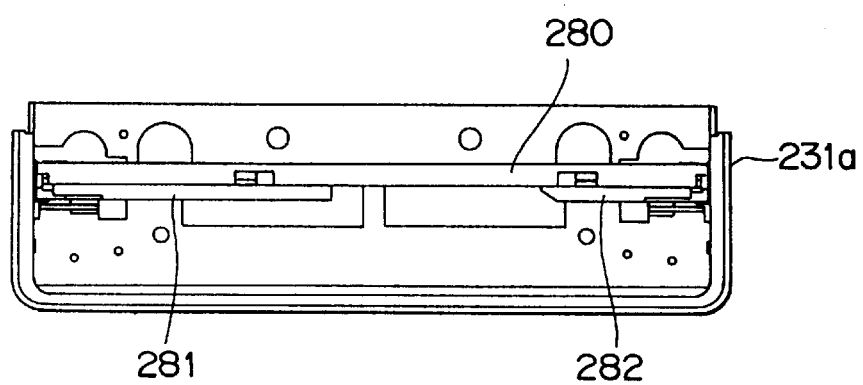
FIG. 26 is a front view of the lower frame of FIG. 25.

FIG. 18 is a schematic view showing how a display unit and a CD player are accommodated in a carriable unit of an on-vehicle electronic device assembly according to a second embodiment of the present invention; FIG. 19 is a schematic view showing a state of the second embodiment in which the display unit and the CD player are drawn out from the carriable unit; FIG. 20 is a sectional view taken along line X—X of FIG. 18; FIG. 21 is a side view of the carriable unit in the second embodiment; FIG. 22 is a front view of the carriable unit in the second embodiment; FIG. 23 is a plan view of the CD player in the second embodiment; FIG. 24 is a bottom view of a control board in the second embodiment; FIG. 25 is a sectional view of a lower frame in the second embodiment; and FIG. 26 is a front view of the lower frame of FIG. 25.

In these drawings, reference numeral 211 denotes a display control portion, numeral 212 denotes a display portion which is supported by a hinge 213 swingably with respect to the display control portion 211, and 212a denotes a display. The display control portion 211 and the display portion 212 constitute a display unit 215.

Reference numeral 216 denotes a CD player, numeral 256 denotes a disc such as a CD-ROM, a music CD, a video CD, a graphic CD, or a like CD, numeral 272 denotes a shaft rotated by an unillustrated motor, numeral 273 denotes a turntable, and numeral 274 denotes a ball chucking device for clipping the disc 256.

The display unit 215 and the CD player 216 are mounted in a carrier case 231 serving as an outer frame such that they can be advanced and retracted in a horizontal direction therein. The display unit 215, the CD player 216, and the carrier case 231 constitute a carriable unit. The carriable unit is removably disposed in an unillustrated mount frame, which is mounted in a mounting space formed in an unillustrated center console of a vehicle and electrically connected to the vehicle. The mount frame and the carriable unit constitute an on-vehicle electronic device assembly.

The display unit 215 is disposed in an upper space of the interior of the carrier case 231; the CD player 216 is disposed in a lower space of the interior of the carrier case 231; and a control board 220 is attached to the carrier case 231, such that it serves as a separator between the display unit 215 and the CD player 216. Connectors 222 and 223 are provided on the control board 220 on the side opposed to the CD player 216; a connector 224 is provided on the display control portion 211 at a predetermined position; and a connector 225 is provided on the CD player 216 at a predetermined position. The connectors 222 and 224 are connected by a flexible cable 227, and the connectors 223 and 225 are connected by a flexible cable 228.

The display unit 215 is disposed above the control board 220 and near the top wall of the carrier case 231 such that it can be advanced and retracted, whereas the CD player 216 is disposed under the control board 220 and near the bottom wall of the carrier case 231 such that it can be advanced and retracted. As a result, spaces AR1 and AR2 are formed above and under the control board 220, respectively, accommodating unillustrated electronic components mounted on the control board 220.

In this case, since the display control portion 211 is substantially identical in thickness to the display portion 212, the space AR1 assumes a flat profile. The thickness of a front (leftward in FIG. 18) portion P2 of the space AR2 must be determined so as to provide a sufficiently large damper stroke S for absorbing vibrations of the turntable 273 generated in association with a travel of a vehicle. By contrast, it is unnecessary to accommodate components at a rear (rightward in FIG. 18) portion P1 of the CD player 216. Accordingly, in the space AR2, a rear portion P3 is made thicker than the front portion P2.

Relatively short electronic components are mounted on the upper side of the control board 220 over the entire space AR1, thereby bringing the control board 220 near the display unit 215. Also, electronic components are mounted on the lower side of the control board 220 over the space AR2 such that short ones are arranged over the front portion P2, and tall ones are arranged over the rear portion P3, thereby bringing the CD player 216 near the control board 220 without impairing the damper stroke S. Examples of tall electronic components include capacitors, connectors, and backup batteries. Examples of short electronic components include resistors and ICs.

As described above, the display unit 215 is disposed at the upper side of the space within the carrier case 231, while the CD player 216 is disposed at the lower side of the space. Also, the control board 220 is installed in the carrier case 231 in such a manner as to be interposed between the display unit 215 and the CD player 216, whereby the display unit 215 and the CD player 216 can be brought near the control board 220. Accordingly, space occupied by the display unit 215, the CD player 216, and the control board 220 can be reduced, so that the display unit 215 and the CD player 216 can be incorporated in an on-vehicle electronic device assembly without increasing the size of a carriable unit.

To use the display unit 215 in the above-mentioned on-vehicle electronic device assembly, a user draws out the display unit 215 and rotates the display portion 212 to raise as shown in FIG. 19. To use the CD player 216, a user draws out the CD player 216 and places the disc 256 thereon.

Since the flexible cables 227 and 228 are each installed in a U-shaped curve, even when the display unit 215 and the CD player 216 are drawn out independently of each other, the flexible cables 227 and 228 follow the movement of the display unit 215 or the CD player 216, not interfering with unillustrated protrusions of the carrier case 231 and electronic components mounted on the control board 220.

Since the display unit 215 is disposed above the CD player 216, the CD player 216 can be drawn out while the display portion 212 is in an upright position. Also, when the display portion 212 is raised, the display portion 212 does not obstruct operation buttons 255, a light-receiving window 252, and like controls on a front panel 260 of the CD player 216. Accordingly, the operability of the display unit 215 and the CD player 216 is improved.

Next will be described the appearance of a carriable unit when the display portion 212 is raised.

The front panel 260 carries the light-receiving window 252 for receiving light from an unillustrated remote controller, a button 253 for switching a CD player feature to and from a television feature, an eject button 254 for drawing out the CD player 216, operation buttons 255, a speaker 258, a lever 257 for removing a carriable unit from the aforementioned mount frame, and the like.

When the CD player 216 is drawn out to an advanced position thereof, a relatively large gap 276 is formed between a partition frame 280 disposed at the center of the front end of the carrier case 231 and the CD player 216. To prevent the disc 256 slipping accidentally off a user's hand from entering far into the interior of the CD player 216 through the gap 276 when the user is placing the disc 256 on the CD player 216 or removing the disc 256 from the CD player 216, protrusions 281 and 282 serving as first disc entry prevention means project downwardly from the bottom surface of the partition frame 280, and protrusions 283 to 285 serving as second disc entry prevention means project upwardly from the top surface of the rear portion P1. The protrusions 281 to 284 are formed from a resin, whereas the protrusion 285 is formed from rubber. The protrusion 283 also serves as a spacer to prevent the hanging flexible cable 228 from contacting the disc 256.

Thus, even when the disc 256 slips accidentally off a user's hand during the user placing the disc 256 on the CD player 216 or removing the disc 256 from the CD player 216, the disc 256 can be prevented from entering far into the interior of the CD player 216 through the gap 276.

As mentioned previously, tall electronic components are mounted on the control board 220 over the rear portion P3; however, arranging tall electronic components in the route of the protrusions 283 and 284, which move with the advancing or retreating CD player 216, is avoided. Accordingly, the protrusions 283 and 284 do not interfere with electronic components mounted on the control board 220.

In the present embodiment, the protrusions 281 and 282 are disposed as the first disc entry prevention means. However, in place of or in addition to the protrusions 281 and 282, electronic components mounted on the control board 220 and arranged over the front portion P2 of the space AR2 may be used as the first disc entry prevention means.

The carrier case 231 includes a lower frame 231*a* and an upper frame 231*b*. A plurality of rests 287 are inwardly projectingly formed on the lower frame 231*a*. The control board 220 is mounted on the rests 287. Reference numeral 288 denotes a frame of the CD player 216, numeral 289 denotes rests for fixing the lower frame 231*a* and the frame 288 together, and numeral 290 denotes a motor for advancing and retracting the CD player 216.

The present invention is not limited to the above-described embodiments. Numerous modifications and variations of the present invention are possible in light of the spirit of the present invention, and they are not excluded from the scope of the present invention.

What is claimed is:

1. An on-vehicle electronic device assembly, comprising:
   (a) a mount frame fixed on a metallic portion of a vehicle body;
   (b) a carriable unit removably disposed in said mount frame; and
   (c) urging means made of metal and mounted on said mount frame for urging said carriable unit in a direction of moving said carriable unit away from said mount frame, wherein
   (d) said carriable unit has a metallic chassis which shields electronic components, and is electrically connected to said urging means via a grounding insertion hole.

2. An on-vehicle electronic device assembly according to claim 1, wherein said carriable unit is composed of an electronic device.

3. An on-vehicle electronic device assembly according to claim 1, wherein a grounding metal piece is loosely fitted into said grounding insertion hole.

4. An on-vehicle electronic device assembly according to claim 1, further comprising a carrier case having a rear wall, wherein the grounding insertion hole is formed in the rear wall of the carrier case.

5. An on-vehicle electronic device assembly according to claim 3, wherein said grounding metal piece includes a trunk portion and two leg portions projecting from said trunk portion; and when said grounding metal piece is set in said grounding insertion hole, a front surface of said trunk portion faces a rear wall of said mount frame through said grounding insertion hole, and said leg portions are in contact with a rear wall of said metallic chassis.

* * * * *